Aug. 12, 1952    D. M. CROFT, JR., ET AL    2,606,383
FISHING LURE
Filed June 13, 1949

Dennis M. Croft, Jr.
John D. Barefield
INVENTORS

BY *Clarence A. O'Brien*
*and Harvey B. Jackson*
Attorneys

Patented Aug. 12, 1952

2,606,388

UNITED STATES PATENT OFFICE 2,606,388

FISHING LURE

Dennis M. Croft, Jr., Marianna, and John D. Barefield, Dellwood, Fla., assignors, by direct and mesne assignments, of one-half to B. E. Hasty Application June 13, 1949, Serial No. 98,856

1 Claim. (Cl. 43—42.15)

This invention relates to a fishing lure of novel shape and construction, the primary object of which is to permit the same to be employed for top water fishing or trolling at shallow margin, substantially from six to eight inches below the surface of the water.

A further object of this invention is to provide a fishing lure having pivotally jointed sections which can dip as well as move laterally when the lure is drawn through the water to impart an attractive wiggling action to the lure, thus increasing its efficiency as an artificial bait.

Another object of this invention is to provide a fishing lure comprising elongated head section and tail sections pivotally connected to an elongated intermediate section, means for urging said head section in a downward position, said means also serving to attach a leader and a gang hook, and means permitting lateral movement of said tail section relative to said intermediate section.

These, together with various ancillary objects and features of the invention which will later become apparent as the following description proceeds, are attained by the device, a preferred embodiment of which has been illustrated, by way of example only, in the accompanying drawings, wherein.

Specific reference will now be made to the drawings. In the several views in the accompanying drawings and in the following specification, similar reference characters indicate corresponding elements throughout.

Figure 1:
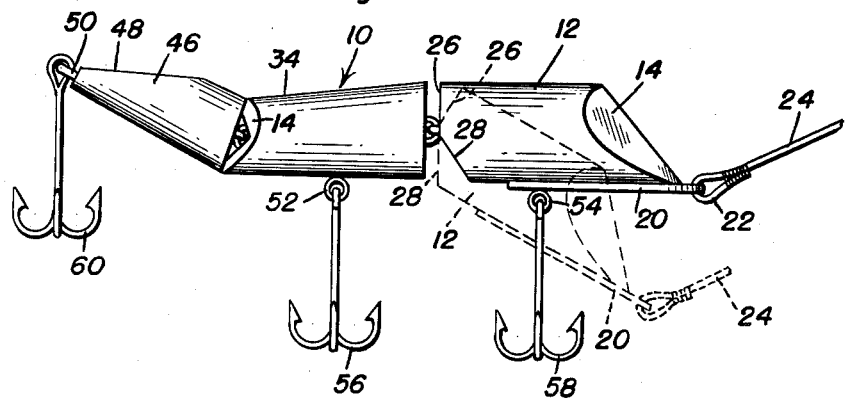
Figure 1 is a side elevational view of the fishing lure.

The lure of the instant invention is generally indicated at 10 and consists of pivotally interconnected sections as will appear more fully hereinafter. The head section 12 is preferably substantially cylindrical in cross-section and includes an oblique-angled front face or leading end 14 which is somewhat heart-shaped, formed by cutting the head section 12 to provide converging faces 16 and 18, said front face 14 being upwardly and rearwardly inclined as shown clearly in the drawings. Attached to the bottom of the head section 12 is a flat metallic plate 20 having an arcuate edge or lip portion which extends beyond the front face 14 and is apertured to receive the eye 22 of a leader 24. The rear wall or edge of the head section 12 includes a flat semi-circular vertical face 26 which is substantially perpendicular to the longitudinal axis of the head section, and a forwardly and downwardly inclined semi-circular face 28 which is oblique to the horizontal plane of said plate 20.

Secured to the rear wall of the head section 12 at the juncture between the faces 26 and 28 is an eye screw 30 which pivotally engages a further eye screw 32 extending into the truncated conical elongated intermediate section 34, the latter screw extending through the flat vertical circular forward wall of the intermediate section. The intermediate section is rearwardly tapered and includes a rearwardly and downwardly inclined rear or trailing end 36 which is also heart-shaped and formed by chamfering said end 34 to provide rearwardly converging sloping faces 38 and 40, respectively.

Extending into the axial portion of said rear end 36 at the juncture of the faces 38 and 40 is an eye screw 42 which pivotally engages a further eye screw 44 extending into the flat circular leading end of said tail section 46 of the lure through the rear wall of the tail section.

The tail section is also generally cylindrical in cross section and has a flattened, downwardly and rearwardly inclined down sloping portion 48 carrying an eye hook 50 at the rear thereof.

Suitable eye hooks 52 and 54 are secured to the intermediate section 34 and the plate 20, respectively, for receiving gang hooks 56 and 58 while the hook 50 carried by the tail 46 also receives a gang hook 60.

Figure 2:
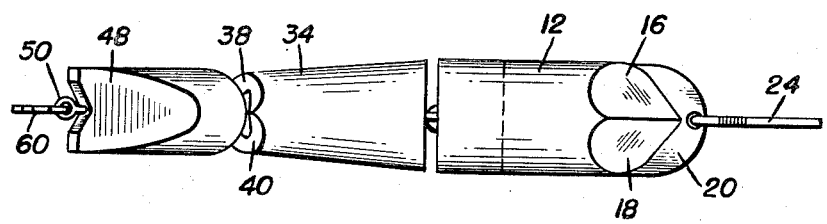
Figure 2 is a top plan view of the fishing lure in one position of operation.
Figure 3:
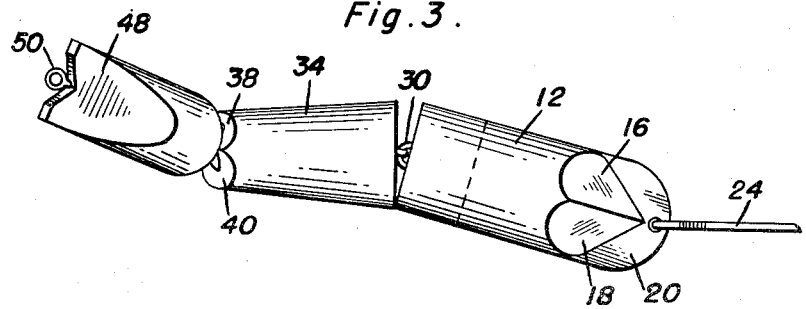
Figure 3 is a top plan view of the lure in another position of operation.
Figure 4:
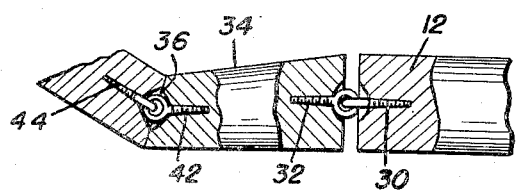
Figure 4 is a longitudinal sectional view through the device shown in Figure 3, some parts being shown in elevation.

In use, when the lure 10 is pulled through the water with tension on the leader 24, the head and intermediate section remain in horizontal alignment with the tail section 46 extending upwardly as shown in solid lines in Figure 1 and also in Figure 2. When tension is released upon the leader 24, the head section 12 pivots downwardly in a dive, as shown clearly in dotted lines in Figure 1, the plate 20 and associated gang hooks 58 constituting weights urging the head section downwardly. However, the tail section 46 cannot possibly pivot downwardly and remains in the upright position at all times. When the lure is dragged through the water, however, by virtue of the sloping faces 38 and 40 of the intermediate section 34 and the pivotal connection of the intermediate section at the juncture of these two faces to the tail section 46, it will be understood that the tail section will move laterally relative to the intermediate section to provide a desired serpentine or wiggling motion. Thus, it will be seen that the lure combines a diving motion at its head portion and a lateral wiggling movement at its tail section.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A lure comprising a head section of cylindrical cross-sectional form having an upwardly and rearwardly inclined leading end, the latter embodying an inclined center rib and chamfered surfaces cooperating therewith and providing a heart-shaped face, the trailing end of said section having a flat vertical semi-circular upper half-portion and a forwardly and downwardly inclined lower half-portion, an eye-screw axially fastened to said trailing end at the juncture of said half-portions, a horizontal flat plate underlying and secured to the ventral portion of said section and having an arcuate lip portion projecting beyond said heart-shaped face, an intermediate section having a flat circular leading end opposed to the trailing end of said head section and provided with an axially arranged eye-screw hingedly connected to said first-named eye-screw, the trailing end of said intermediate section being inclined rearwardly and downwardly and having chamfered surfaces defining a vertical center rib, an eye-screw mounted axially in said last-named trailing end, a tail section having a flat circular leading end opposed to the adjacent trailing end of said intermediate section, and another eye-screw, the latter centrally mounted in said last-named flat circular leading end and being hingedly connected with the eye-screw in the trailing end last-mentioned.

DENNIS M. CROFT, Jr.
JOHN D. BAREFIELD.

REFERENCES CITED

The following references are of record in the file of this patent:

UNITED STATES PATENTS

| Number | Name | Date |
|---|---|---|
| 1,109,439 | Maus | Sept. 1, 1914 |
| 1,359,618 | Oliver et al. | Nov. 23, 1920 |
| 1,477,756 | Heddon et al. | Dec. 18, 1923 |
| 1,486,101 | McGorden | Mar. 4, 1924 |
| 1,545,683 | Nowak | July 14, 1925 |
| 2,159,591 | Leusch et al. | May 23, 1939 |
| 2,190,791 | Larson | Feb. 20, 1940 |
| 2,249,770 | McArthur | July 22, 1941 |
| 2,503,529 | Wardrip | Apr. 11, 1950 |